(12) United States Patent
Kanazawa (10) Patent No.: US 9,129,205 B2
(45) Date of Patent: Sep. 8, 2015

(54) IMAGE FORMING APPARATUS

(71) Applicant: KYOCERA Document Solutions Inc., Osaka-shi, Osaka (JP)

(72) Inventor: Keizen Kanazawa, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/322,239

(22) Filed: Jul. 2, 2014

(65) Prior Publication Data

US 2015/0015903 A1 Jan. 15, 2015

(30) Foreign Application Priority Data

Jul. 10, 2013 (JP) ................. 2013-144736

(51) Int. Cl.
*G06K 15/02* (2006.01)

(52) U.S. Cl.
CPC ........ *G06K 15/1802* (2013.01); *G06K 15/1828* (2013.01)

(58) Field of Classification Search
CPC .......... G06K 15/02; G06K 2215/0005; G06K 2215/0042; G06K 15/1802; G06K 15/1828
USPC ................................................. 358/1.1, 1.11
See application file for complete search history.

(56) References Cited

U.S. PATENT DOCUMENTS

| 7,031,910 B2 * | 4/2006 | Eisele ............................ 704/10 |
| 2004/0061886 A1 * | 4/2004 | Sato et al. .................... 358/1.13 |

FOREIGN PATENT DOCUMENTS

| JP | 02047078 A | 2/1990 |
| JP | 02202463 A | 8/1990 |
| JP | 06289838 A | 10/1994 |

* cited by examiner

*Primary Examiner* — Iriana Cruz (74) *Attorney, Agent, or Firm* — Alleman Hall McCoy Russell & Tuttle LLP (57) ABSTRACT

An image forming apparatus according to one aspect of the present disclosure includes a font cache storage portion and a first determination portion. The font cache storage portion is configured to store a character image by an LRU method. The first determination portion is configured to determine whether to store the character image at a position of a head of the font cache storage portion, on the basis of a used state of the character image.

9 Claims, 6 Drawing Sheets

IMAGE FORMING APPARATUS

INCORPORATION BY REFERENCE

This application is based upon and claims the benefit of priority from the corresponding Japanese Patent Application No. 2013-144736 filed on Jul. 10, 2013, the entire contents of which are incorporated herein by reference.

BACKGROUND

The present disclosure relates to an image forming apparatus having a cache memory area (hereinafter, referred to as "font cache") in which bitmap graphics of character fonts are stored.

A typical image forming apparatus that is a printer, a multifunctional printer, multifunctional peripheral equipment, or an MFP (Multifunction Peripheral) such as a multifunction machine or the like prints print data received from a PC (personal computer) or print data generated on the basis of document data of a read document from a reader, on a paper sheet or the like, thereby performing output (printout). The typical image forming apparatus converts a character font of the print data to bitmap graphics (raster-format data) and performs imaging (hereinafter, referred to as "rasterization"). However, when rasterization is performed each time a character font is converted to bitmap graphics, the processing takes much time. Thus, the typical image forming apparatus has a font cache, and bitmap graphics (hereinafter, referred to as "character images") of character fonts are stored in the font cache. If a character image corresponding to a character font of print data has been stored in the font cache, it is possible to take out the character image from the font cache. Only if the corresponding character image has not been stored in the font cache, rasterization of the character font is performed. As described above, in the typical image forming apparatus having a font cache, storing of frequently-used character images in the font cache reduces the processing time in rasterization of a character font and allows for high-speed printout.

Such widespread use of a font cache in an image forming apparatus allows for high-speed printing. For example, a printer has been known in which: when print data is inputted from an external information processing apparatus, it is determined whether the print data falls within a character pattern formation range; and if the print data falls within the character pattern formation range and a character pattern of the print data has not been formed, the character pattern is formed and stored, and the same character pattern is prevented from being formed again, thereby increasing a printing speed. In addition, a printer has been known in which after data of a certain unit (e.g., 1 page) is received, it is checked how many times each font data is used in the page, and it is determined whether to create a cache/font, on the basis of the frequency of use, whereby it is possible to effectively create a cache/font. Moreover, a controller or a method has been known in which a buffer for LRU (Least Recently Used) delay processing is provided, update of a font cache is delayed, and deletion of a character pattern that is possibly used again in the near future is prevented, thereby improving printing performance.

SUMMARY

An image forming apparatus according to one aspect of the present disclosure includes a font cache storage portion and a first determination portion. The font cache storage portion is configured to store a character image by an LRU method. The first determination portion is configured to determine whether to store the character image at a position of a head of the font cache storage portion, on the basis of a used state of the character image.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First, a first embodiment (hereinafter, referred to as "Embodiment 1") for carrying out the present disclosure will be described with reference to the drawings. An image forming apparatus 200 according to Embodiment 1 is set such that in a font cache in which a character image is accessed by an LRU (Least Recently Used) method, when a range where character images can be stored in the font cache is exceeded, character images of character codes having a high frequency of use in a specific linguistic area are prevented from being deleted and character images of character codes having a low frequency of use in the specific linguistic area are easily deleted. Thus, it is possible to improve the use efficiency of character images in the font cache. It should be noted that an example of the character codes is Unicode which is a global common character set.

Figure 1:
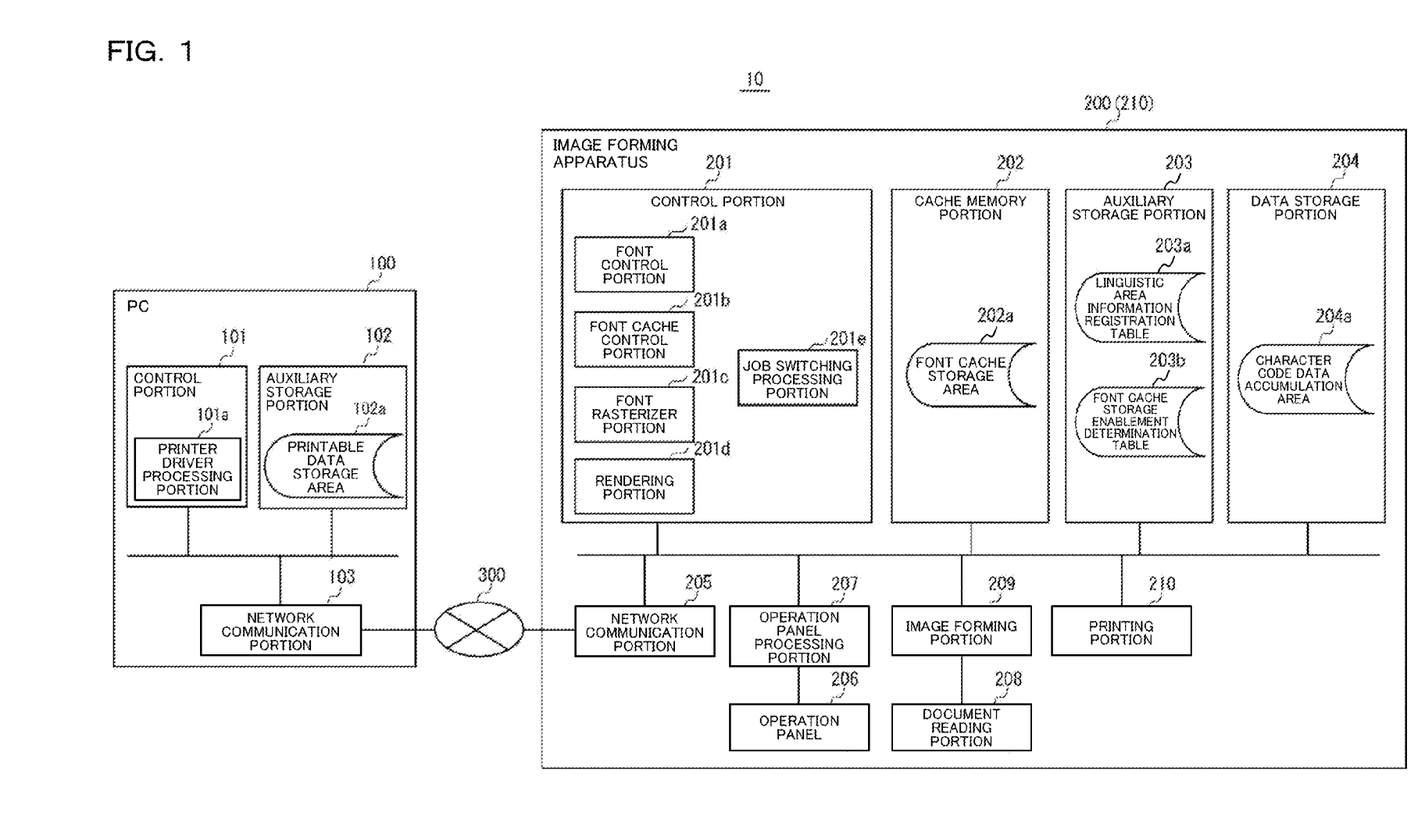
FIG. 1 is a diagram showing the functional configuration of an image forming system according to the present disclosure.

The functional configuration of an image forming system 10 according to Embodiment 1 will be described with reference to FIG. 1. The image forming system 10 shown in FIG. 1 includes a PC 100 and the image forming apparatus 200. The PC 100 and the image forming apparatus 200 are connected to each other via a network 300. The PC 100 is an operation terminal capable of requesting the image forming apparatus 200 to print data (hereinafter, referred to as "printable data"). The image forming apparatus 200 is a printer, an MFP, a multifunction machine, or the like and has a font cache.

First, the functional configuration of the PC 100 will be described with reference to FIG. 1. As shown in FIG. 1, the PC 100 includes a control portion 101, an auxiliary storage portion 102, and a network communication portion 103. These portions are connected to each other via a bus or the like.

The control portion 101 includes a main storage device such as a RAM, a ROM, or the like and a computing device such as a CPU (Central Processing Unit) or the like. In addition, the control portion 101 includes interfaces such as various I/Os, a USB (Universal Serial Bus), and the like, a bus controller, and the like and comprehensively controls the PC 100. The control portion 101 is provided with a printer driver processing portion 101*a* that requests the image forming apparatus 200 to print printable data.

The auxiliary storage portion 102 is an auxiliary storage device composed of a flash memory or the like and stores data and a program for a process executed by the control portion 101. The auxiliary storage portion 102 is provided with a printable data storage area 102*a* that temporarily stores printable data that is to be transmitted from the PC 100 to the image forming apparatus 200.

The network communication portion 103 includes a detachable LAN interface for connecting to the network 300. The LAN interface includes a network portion that performs intelligent transmission/reception based on various network protocols such as TCP/IP, AppleTalk, SMB, and the like.

Next, the functional configuration of the image forming apparatus 200 will be described. As shown in FIG. 1, the image forming apparatus 200 includes a control portion 201, a cache memory portion 202, an auxiliary storage portion 203, a data storage portion 204, a network communication portion 205, an operation panel 206, an operation panel processing portion 207, a document reading portion 208, an image forming portion 209, and a printing portion 210. The control portion 201, the cache memory portion 202, the auxiliary storage portion 203, the data storage portion 204, the network communication portion 205, the operation panel processing portion 207, the image forming portion 209, and the printing portion 210 are connected to each other via a bus or the like.

The control portion 201 includes a computing device such as an MPU (Micro Processing Unit), a CPU (Central Processing Unit), or the like. The control portion 201 includes interfaces such as various I/Os, a USB (Universal Serial Bus), and the like, a bus controller, and the like and comprehensively controls the image forming apparatus 200. The control portion 201 is provided with functions of a font control portion 201*a*, a font cache control portion 201*b*, a font rasterizer portion 201*c*, and a rendering portion 201*d*. A detailed procedure of character image output by these functions will be described later. It should be noted that a job switching processing portion 201*e* provided in the control portion 201 is a function that an image forming apparatus 210 according to Embodiment 2 has.

The cache memory portion 202 is a high-speed main storage device such as a RAM or the like. Data for which high-speed processing is required is stored in the cache memory portion 202. The cache memory portion 202 is provided with a font cache storage area 202*a* (font cache storage portion) that serves as a so-called font cache. A character image is stored in the font cache storage area 202*a* by the font cache control portion 201*b* on the basis of the LRU method. A procedure of the font cache control portion 201*b* storing a character image in the font cache storage area 202*a* will be described later.

The auxiliary storage portion 203 is an auxiliary storage device composed of a flash memory or the like. Data and a program used for a process executed by the control portion 201 are stored in the auxiliary storage portion 203. The auxiliary storage portion 203 is provided with a linguistic area information registration table 203*a* that stores linguistic area information that is set by the image forming apparatus 200. Any of linguistic area information such as "English-speaking area", "Chinese-speaking area", "Japanese-speaking area", "French-speaking area", "German-speaking area", and the like is set in the linguistic area information registration table 203*a* by the font cache control portion 201*b* (linguistic area information registration portion). In other words, the font cache control portion 201*b* registers (sets) any of the linguistic area information such as "English-speaking area", "Chinese-speaking area", "Japanese-speaking area", "French-speaking area", "German-speaking area", and the like in the linguistic area information registration table 203*a*. The linguistic area information is determined: on the basis of a result obtained by counting each character code stored in a character code data accumulation area 204*a*; or by using a data analysis technique such as data mining or the like. When the data analysis technique such as data mining or the like is executed, execution processing thereof is performed in the background in which processing of printing data or image data is not performed. In addition, the auxiliary storage portion 203 is provided with a font cache storage enablement determination table (hereinafter, referred to as determination table) 203*b* used for determining whether to store a character image in the font cache storage area 202*a*. The determination table 203*b* will be described in detail later.

The data storage portion 204 is a hard disk drive which stores data and a program. The data storage portion 204 is provided with the character code data accumulation area 204*a* (accumulation portion) in which character codes of printable data that is requested to be printed are accumulated and stored by the font cache control portion 201*b*. The font cache control portion 201*b* sets linguistic area information in the linguistic area information registration table 203*a* on the basis of character code data accumulated in the character code data accumulation area 204*a*. In addition, the font cache control portion 201*b* sets a character code of a character font that has a high frequency of use and should be converted to a character image and stored, in the determination table 203*b* on the basis of the character code data accumulated in the character code data accumulation area 204*a*.

The network communication portion 205 includes a detachable LAN interface for connecting to the network 300. The LAN interface includes a network portion that performs intelligent transmission/reception based on various network protocols such as TCP/IP, AppleTalk, SMB, and the like.

The operation panel 206 (linguistic area information input portion) accepts display of an operation menu and an operation performed with a finger of a user. In addition, the user is allowed to input various information (linguistic area information, etc.) that is to be set in the image forming apparatus 200, through the operation panel 206.

The operation panel processing portion 207 performs: a process of displaying operation items of the functions that the image forming apparatus 200 has, on the operation panel 206; and a process of inputting operation data for an operation performed by the user through the operation panel 206. In addition, the operation panel processing portion 207 processes various information that is inputted through the operation panel 206 and is to be set in the image forming apparatus 200.

The document reading portion 208 reads a document that is set on a document table of the image forming apparatus 200. By the user giving a reading request through the operation panel 206, the document reading portion 208 is allowed to read the document that is set on the document table.

The image forming portion 209 converts document data obtained by reading the document by the document reading portion 208 on the basis of the reading request from the user, to printable data or image data of an image that can be transmitted via FAX or e-mail.

The printing portion 210 prints printable data that is requested by the user to be printed, on copy paper or the like.

Figure 2:
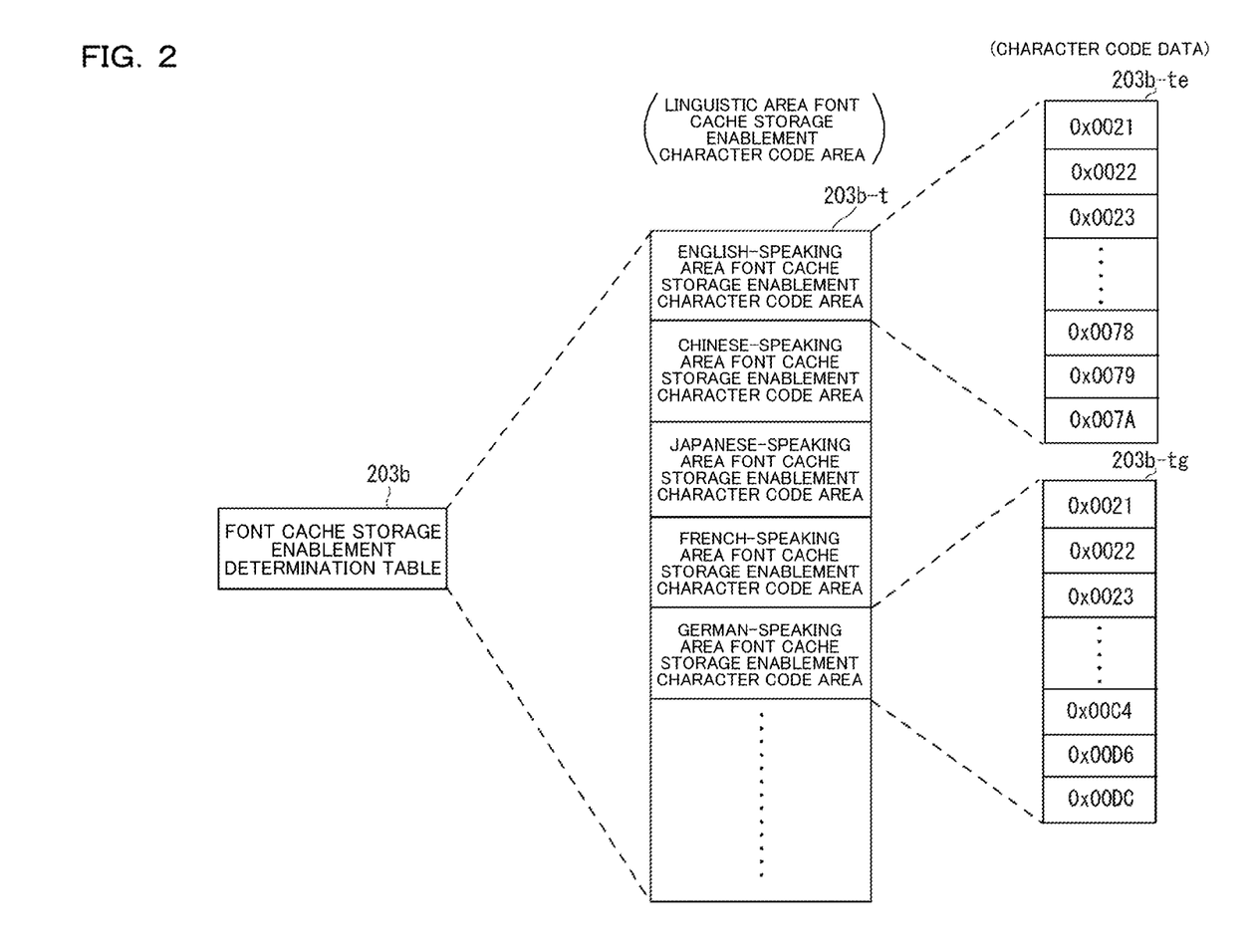
FIG. 2 is a configuration diagram of a font cache storage enablement determination table shown in FIG. 1.

Next, the configuration of the determination table 203*b* will be described with reference to FIG. 2. The determination table 203*b* is a table in which character images that are to be stored in the font cache storage area 202*a* are set for each linguistic area. As shown in FIG. 2, the determination table 203*b* includes font cache storage enablement character code areas (hereinafter, referred to as character code areas) 203*b-t* corresponding to a plurality of linguistic areas. In addition, character codes having a high frequency of use in each linguistic area, namely, character codes of character images that are to be registered in the font cache storage area 202*a* in each linguistic area, are set in each code area 203*b-t*. For example, character codes having a high frequency of use in "English-speaking area", namely, character codes of character images that are to be registered in the font cache storage area 202*a* in "English-speaking area", are set in a character code area 203*b-te* for the English-speaking area. Similarly, character codes having a high frequency of use in "German-speaking area", namely, character codes of character images that are to be registered in the font cache storage area 202*a* in "German-speaking area", are set in a character code area 203*b-tg* for the German-speaking area. A predetermined number of character codes are taken out from among the character codes stored in the character code data accumulation area 204*a*, in descending order of frequency of use and stored in each character code area 203*b-t* of the determination table 203*b* by the font cache control portion 201*b*. As shown in FIG. 2, a character code "0x00C4" is a character code having a high frequency of use in "German-speaking area" but is a character code having a low frequency of use in "English-speaking area". Therefore, the character code "0x00C4" is set in the character code area 203*b-tg* for the German-speaking area, but is not set in the character code area 203*b-te* for the English-speaking area.

Figure 3A:
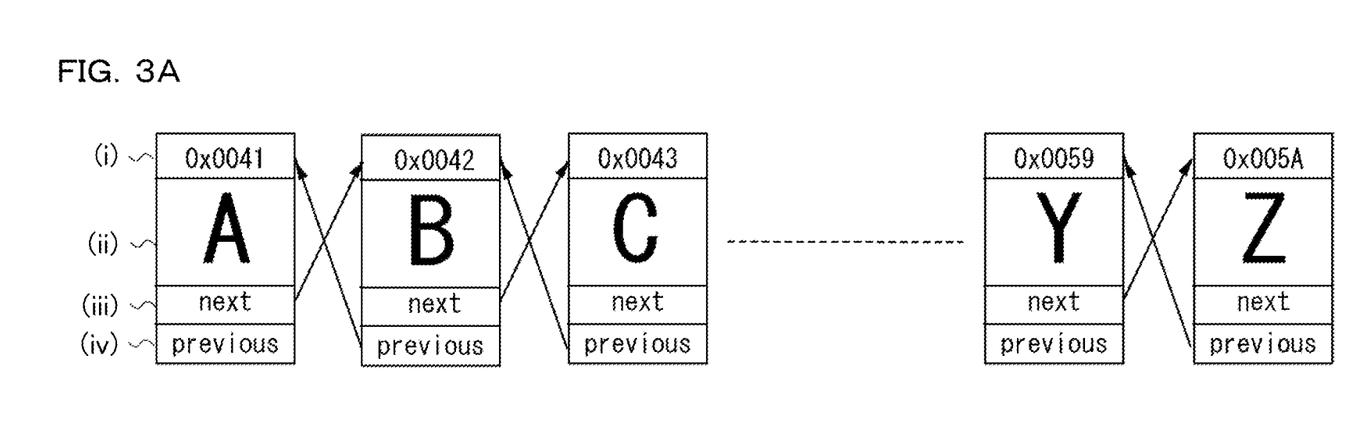
FIGS. 3A and 3B are diagrams illustrating a procedure of controlling a font cache storage area according to Embodiment 1.
Figure 3B:
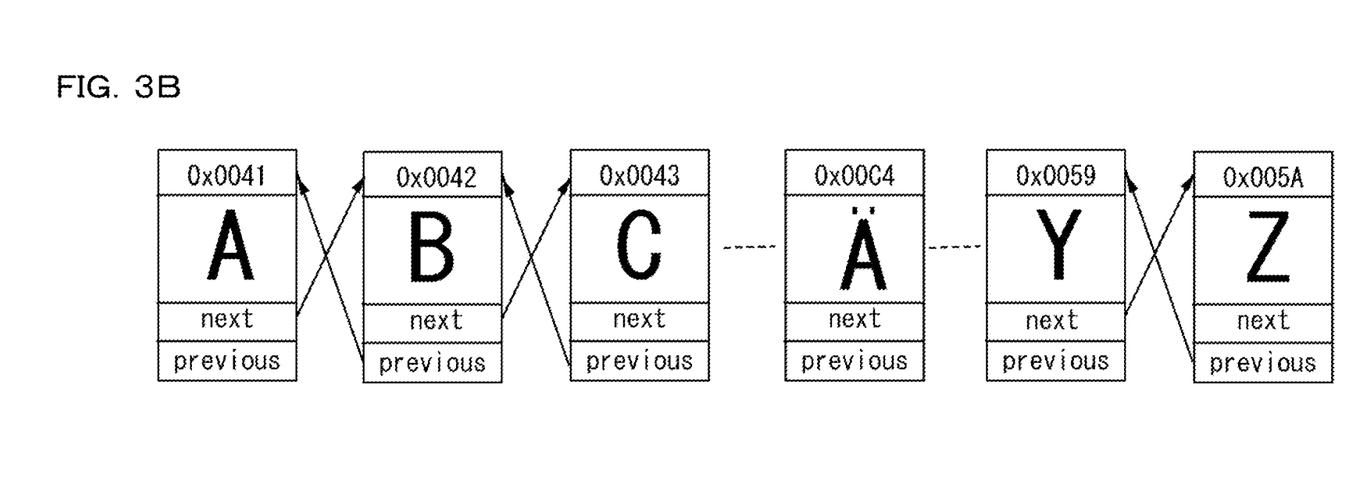

Next, a procedure of the font cache control portion 201*b* controlling the character images stored in the font cache storage area 202*a* will be described with reference to FIGS. 3A and 3B. A plurality of character image data is stored in the font cache storage area 202*a* and coupled (hereinafter, referred to as "linked") on the basis of the LRU method. Each character image data in the font cache storage area 202*a* in such a link structure includes (i) "character code" (ii) "character image", (iii) "next" (hereinafter, referred to as "next point address", and (iv) "previous" (hereinafter, referred to as "previous point address") as shown in FIG. 3A. The Unicode code of the character image is set in the "character code". Bitmap graphics obtained by converting the character code by the font rasterizer portion 201*c* is set in the "character image". An address of character image data located next in the link is set in the "next point address". If the character image data is at the end of the link, "E" is set in the "next point address" of the character image data. An address of character image data located previously in the link is set in the "previous point address". If the character image data is at the head of the link, "S" is set in the "previous point address" of the character image data. In the font cache storage area 202*a* having the link structure based on the LRU method in which the "next point address" and the "previous point address" are provided in the character image data as described above, character image data that is to be newly stored therein is linked at the head at which data is most difficult to delete. In addition, even when character image data that has already been stored in the font cache storage area 202*a* is used, the used character image data is moved and linked at the head at which data is most difficult to delete. If the font cache storage area 202*a* becomes full by continuing linking of character image data in the font cache storage area 202*a* as described above, so that new character image data cannot be linked, the character image data linked at the end is deleted. In other words, in the LRU method, least recently used character image data is deleted. Thus, even character image data having a low frequency of use is linked at the head if the character image data is character image data that is to be newly stored or accessed character image data that has already been stored.

However, in Embodiment 1, even character image data that is to be newly stored in the font cache storage area 202*a* or accessed character image data that has already been stored is not linked at the head and is linked at a position at which character image data is easily deleted, if the character image data is character image data having a low frequency of use in a registered linguistic area. The linguistic area used in this case is taken out from the linguistic area information that is set in the linguistic area information registration table 203*a*. In addition, a determination as to whether the frequency of use of the character image data in the linguistic area is high or low is performed on the basis of the character codes of the character images that are stored in the character code area 203*b-t* of the determination table 203*b* shown in FIG. 2. For example, when the linguistic area information that is set in the linguistic area information registration table 203*a* is the English-speaking area, the character code area 203*b-te* for the English-speaking area shown in FIG. 2 is taken out. When the character image of the character code "0x00C4" in the English-speaking area is newly accessed, character image data of character codes "0x0041" to "0x005A" has been stored in the font cache storage area 202*a* as shown in FIG. 3A, but character image data of the character code "0x00C4" has not been stored therein. In such a case, the font cache control portion 201*b* determines whether the character code "0x00C4" is present in the character code area 203*b-te* for the English-speaking area shown in FIG. 2. If the character code "0x00C4" is not present, the font cache control portion 201*b* determines that the frequency of use of the character code "0x00C4" is low in the English-speaking area. In this case, the character image data of the character code "0x00C4" is not linked at the position of the head of the font cache storage area 202*a* and is linked at a predetermined rear position as shown in FIG. 3B.

Figure 4:
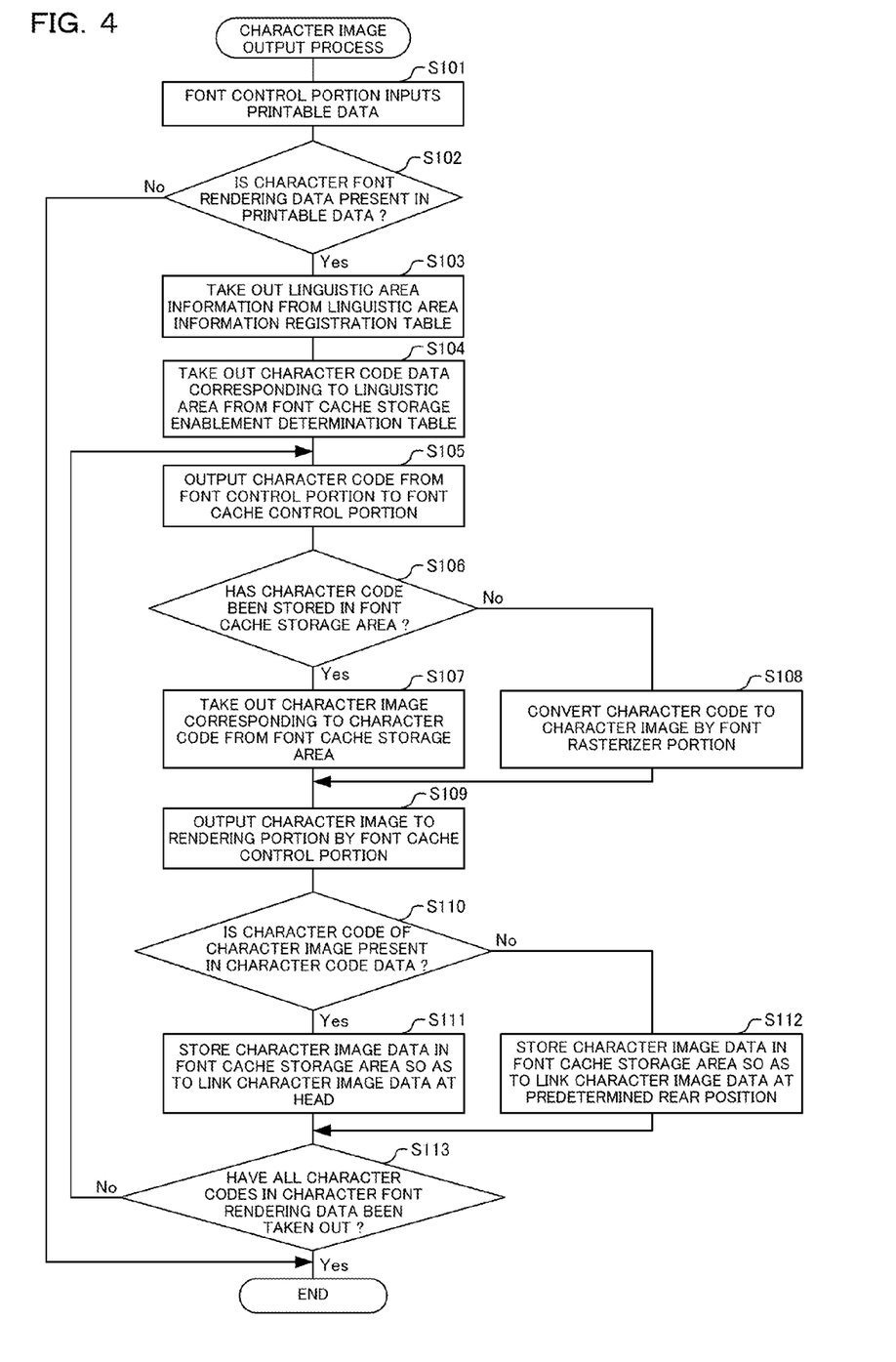
FIG. 4 is a flowchart showing flow of a character image output process according to Embodiment 1.

Next, a character image output process executed by the functions of the font control portion 201*a*, the font cache control portion 201*b*, the font rasterizer portion 201*c*, and the rendering portion 201*d*, which are provided in the control portion 201 of the image forming apparatus 200 according to Embodiment 1 of the present disclosure, will be described with reference to FIG. 4.

When the PC 100 transmits printable data by the network communication portion 103 to the image forming apparatus 200 via the network 300, the network communication portion 205 of the image forming apparatus 200 receives the printable data. When the network communication portion 205 outputs the received printable data to the control portion 201, the control portion 201 inputs the printable data and activates the font control portion 201*a*, thereby starting the character image output process.

(Step S101)

First, the font control portion 201*a* inputs the printable data.

(Step S102)

Next, the font control portion 201*a* determines whether information for rendering character fonts of character codes (hereinafter, referred to as "character font rendering data") is present in the printable data. If the character font rendering data is present (Yes in step S102), the process proceeds to step S103. If the character font rendering data is not present (No in step S102), the character image output process is ended.

(Step S103)

In the case of Yes in step S102, the font control portion 201a takes out the linguistic area information from the linguistic area information registration table 203a.

(Step S104)

Next, the font control portion 201a takes out the character code data in the character code area 203b-t corresponding to the linguistic area information taken out from the determination table 203b in step S103. For example, if the linguistic area information is "English-speaking area", the character code data in the character code area 203b-te for the English-speaking area shown in FIG. 2 is taken out.

(Step S105)

Next, the font control portion 201a takes out a character code from the character font rendering data and outputs the character code to the font cache control portion 201b.

(Step S106)

Next, upon input of the character code from the font control portion 201a, the font cache control portion 201b determines whether the character code has been stored in the font cache storage area 202a. If the character code has been stored in the font cache storage area 202a (Yes in step S106), the process proceeds to step S107. If the character code has not been stored in the font cache storage area 202a (No in step S106), the process proceeds to step S108.

(Step S107)

In the case of Yes in step S106, the font cache control portion 201b takes out the character image corresponding to the character code from the font cache storage area 202a, and the process proceeds to step S109.

(Step S108)

In the case of No in step S106, the font cache control portion 201b converts the character code to a character image by the font rasterizer portion 201c.

(Step S109)

Next, upon input of the character image taken out from the font cache storage area 202a in step S107 or the character image obtained by the conversion in step S108, the font cache control portion 201b outputs the character image to the rendering portion 201d, and the process proceeds to step S110.

(Step S110)

Next, the font cache control portion 201b (first determination portion) determines whether to store the character image at the position of the head of the font cache storage area 202a, on the basis of a used state of the character image. Specifically, the font cache control portion 201b determines whether the character code of the character image taken out in step S107 or the character code of the character image obtained by the conversion in step S108 is present in the character code data in the character code area 203b-t that is taken out in step S104. If it is determined that the character code of the character image is present in the character code data (Yes in step S110), it is determined that the character image should be stored at the position of the head, and the process proceeds to step S111. In other words, if the character code of the character image is present as one of the character codes that are set for each linguistic area, the font cache control portion 201b determines to store the character image at the position of the head. If it is determined that the character code of the character image is not present in the character code data (No in step S110), the process proceeds to step S112.

(Step S111)

In the case of Yes in step S110, the font cache control portion 201b stores the character image data of the character code in the font cache storage area 202a so as to link the character image data at the position of the head of the font cache storage area 202a.

(Step S112)

In the case of No in step S110, the font cache control portion 201b stores the character image data of the character code in the font cache storage area 202a so as to link the character image data at a predetermined rear position.

(Step S113)

Next, the font cache control portion 201b determines whether all the character codes in the character font rendering data in the printable data have been taken out. If all the character codes in the character font rendering data have been taken out (Yes in step S113), the character image output process is ended. If not all the character codes in the character font rendering data have been taken out (No in step S113), the process returns to step S105.

As described above, in the image forming apparatus 200 according to Embodiment 1, linguistic area information is set in the linguistic area information registration table 203a on the basis of the character code data accumulated in the character code data accumulation area 204a. In addition, character code data of character fonts having a high frequency of use in each linguistic area is set in the determination table 203b. The character code data in the character code area 203b-t is taken out from the determination table 203b on the basis of the linguistic area information, and it is determined whether the "character code" of character image data is present in the character code data. If the "character code" is present, the font cache control portion 201b stores the character image data in the font cache storage area 202a so as to link the character image data at the position of the head. If the character code is not present, the font cache control portion 201b stores the character image data in the font cache storage area 202a so as to link the character image data at the predetermined rear position. Thus, the use efficiency of the character images in the font cache storage area 202a is improved, and the use efficiency of the memory of the font cache storage area 202a is also improved.

Next, a second embodiment (hereinafter, referred to as "Embodiment 2") for carrying out the present disclosure will be described with reference to the drawings. In an image forming apparatus according to Embodiment 2, in a font cache in which a character image is accessed by an LRU method, a character image of a character code having a high frequency of use in a specific linguistic area is held in the font cache even after a unit of a series of printing process steps (hereinafter, referred to as "job") is switched, and a character image of a character code having a low frequency of use in the specific linguistic area is deleted from the font cache after job switching. Thus, it is possible to improve the use efficiency of character images in the font cache. It should be noted that an example of the character codes is Unicode which is a global common character set.

The functional configuration of an image forming system 10 according to Embodiment 2 will be described with reference to FIG. 1. The image forming system 10 shown in FIG. 1 includes a PC 100 and an image forming apparatus 210, and the PC 100 and the image forming apparatus 210 are connected to each other via a network 300. The functional configuration of the PC 100 is the same as that in Embodiment 1. The functional configuration of the image forming apparatus 210 is the same as that in Embodiment 1, except that the job switching processing portion 201e (second determination portion) is provided in the control portion 201. A job switching process executed by the job switching processing portion 201e of the control portion 201 will be described in detail later.

Figure 5A:
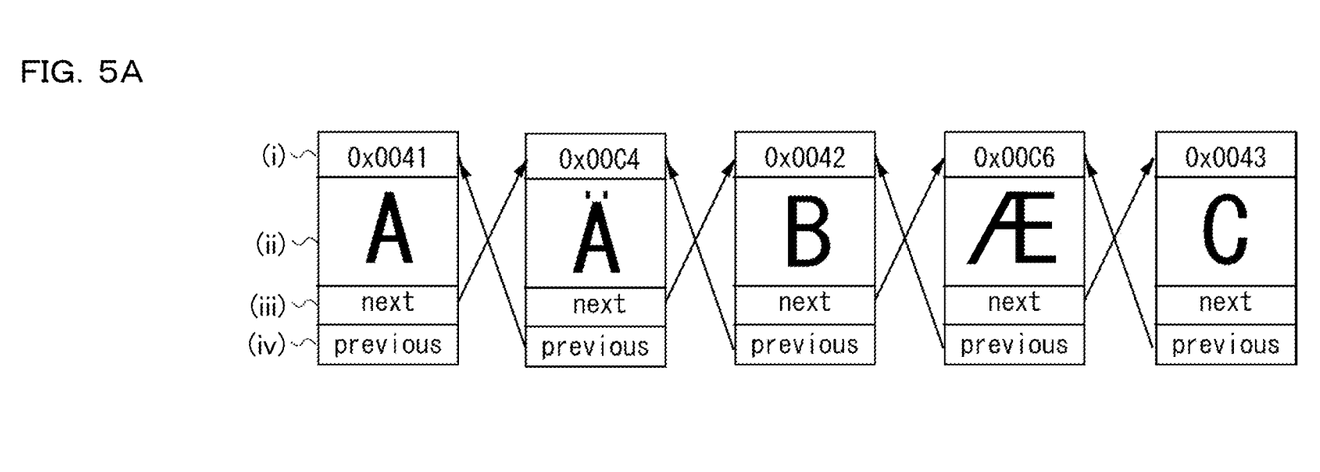
FIGS. 5A and 5B are diagrams illustrating a procedure of controlling a font cache storage area according to Embodiment 2.
Figure 5B:
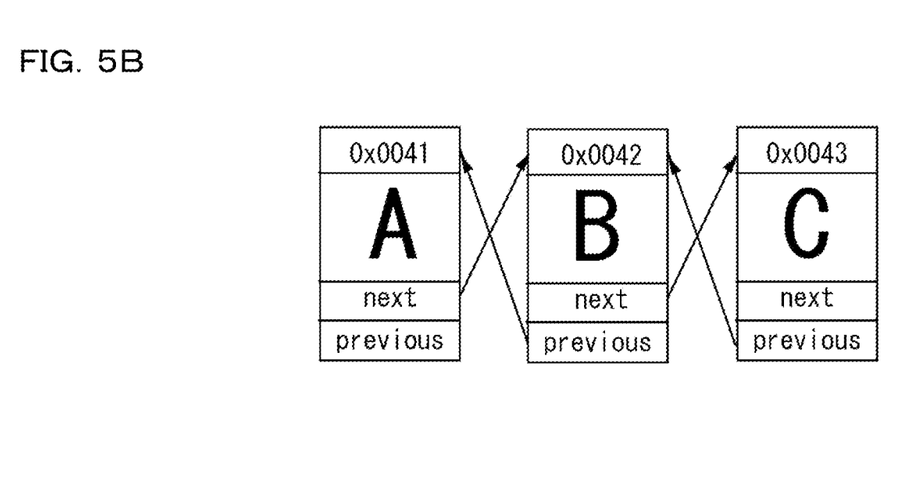

Next, a procedure of controlling the character image data stored in the font cache storage area 202a by the job switching processing portion 201e when a job is switched will be described with reference to FIGS. 5A and 5B. It should be noted that the font cache storage area 202a according to Embodiment 2 has a link structure of character image data in which "next point address" and "previous point address" are provided, and uses the LRU method, similarly to Embodiment 1.

Such a font cache storage area 202a having the link structure based on the LRU method is used in Embodiment 2, and a character code having a high frequency of use in a specific linguistic area is held in the font cache storage area 202a when a job is switched. Only a character code having a low frequency of use in the specific linguistic area is deleted from the font cache storage area 202a. The linguistic area used in this case is taken out from the linguistic area information that is set in the linguistic area information registration table 203a. In addition, a determination as to whether the frequency of use of the character image data in the linguistic area is high or low is performed on the basis of the character codes of the character images that are stored in the character code area 203b-t of the determination table 203b shown in FIG. 2. For example, when the linguistic area information that is set in the linguistic area information registration table 203a is the English-speaking area, the character code area 203b-te for the English-speaking area shown in FIG. 2 is taken out. When a job is switched in the English-speaking area, character image data of character codes "0x0041", "0x00C4", "0x0042", "0x00C6", and "0x0043" has been stored in the font cache storage area 202a as shown in FIG. 5A. In such as case, it is determined whether these character codes are present in the character code area 203b-te for the English-speaking area shown in FIG. 2. If the character codes "0x00C4" and "0x00C6" are not present, it is determined that the frequency of use of each of the character codes "0x00C4" and "0x00C6" is low in the English-speaking area, and the character image data of the character codes "0x00C4" and "0x00C6" is deleted as shown in FIG. 5B.

Figure 6:
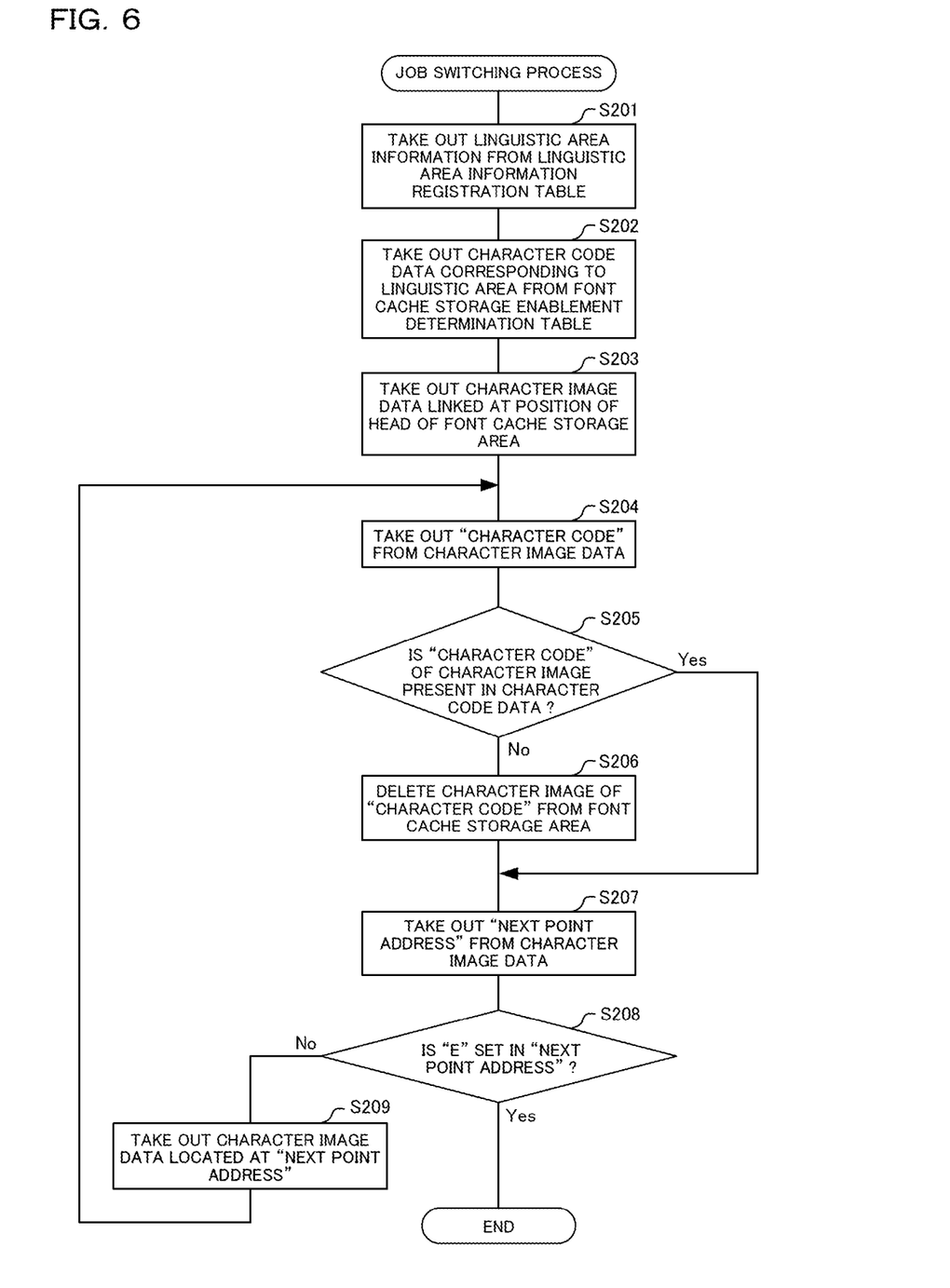
FIG. 6 is a flowchart showing flow of a job switching process according to Embodiment 2.

Next, the job switching process executed by the job switching processing portion 201e, which is provided in the control portion 201 of the image forming apparatus 210 according to Embodiment 2 of the present disclosure, will be described with reference to FIG. 6.

When the PC 100 transmits a notification that a job is to be switched (hereinafter, referred to as "job switching notification"), by the network communication portion 103 to the image forming apparatus 200 via the network 300, the network communication portion 205 of the image forming apparatus 200 receives the job switching notification. When the network communication portion 205 outputs the received job switching notification to the control portion 201, the control portion 201 inputs the job switching notification and activates the job switching processing portion 201e, thereby starting the job switching process.

(Step S201)
First, the job switching processing portion 201e takes out the linguistic area information from the linguistic area information registration table 203a.

(Step S202)
Next, the job switching processing portion 201e takes out the character code data in the character code area 203b-t corresponding to the linguistic area information taken out from the determination table 203b in step S201. For example, if the linguistic area information is "English-speaking area", the character code data in the character code area 203b-te for the English-speaking area shown in FIG. 2 is taken out.

(Step S203)
Next, the job switching processing portion 201e takes out the character image data linked at the position of the head of the font cache storage area 202a. Since "S" is set in the "previous point address" of the character image data linked at the position of the head, the job switching processing portion 201e takes out the character image data in which "S" is set in the "previous point address".

(Step S204)
Next, the job switching processing portion 201e takes out the "character code" from the character image data taken out in step S203.

(Step S205)
Next, the job switching processing portion 201e determines whether the "character code" taken out in step S204 is present in the character code data taken out in step S202. If the "character code" is present in the character code data (Yes in step S205), the process proceeds to step S207. If the "character code" is not present in the character code data (No in step S205), the process proceeds to step S206.

(Step S206)
In the case of No in step S205, the job switching processing portion 201e deletes the character image data of the "character code" from the font cache storage area 202a.

(Step S207)
Next, the job switching processing portion 201e takes out the "next point address" from the character image data.

(Step S208)
Next, the job switching processing portion 201e determines whether the character image data is located at the end of the link, by determining whether "E" is set in the "next point address". If "E" is set in the "next point address" (Yes in step S208), the job switching process is ended. If "E" is not set in the "next point address" (No in step S208), the process proceeds to step S209.

(Step S209)
In the case of No in step S208, the job switching processing portion 201e takes out character image data stored at the address that is set in the "next point address", from the font cache storage area 202a, and the process returns to step S204.

As described above, in the image forming apparatus 210 according to Embodiment 2, it is possible to set linguistic area information in the linguistic area information registration table 203a on the basis of the character code data accumulated in the character code data accumulation area 204a. In addition, it is possible to set, in the determination table 203b, character code data of character fonts having a high frequency of use in each linguistic area. The character code data in the character code area 203b-t is taken out from the determination table 203b on the basis of the linguistic area information, and it is determined whether the "character code" of character image data in the font cache storage area 202a is present in the character code data in the determination table 203b, when a job is switched. If the "character code" is present in the character code data, the character image data of the "character code" is held in the font cache storage area 202a since the possibility that the character image data of the "character code" is used in the next job is high. Thus, the use efficiency of the character images in the font cache storage area 202a is improved. In addition, if the "character code" is not present in the character code data, the character image data of the "character code" is deleted from the font cache storage area 202a since the possibility that the character image data of the "character code" is used in the next job is low. Thus, the use efficiency of the memory of the font cache storage area 202a is improved.

It should be noted that in the above-described embodiments, linguistic area information is set in the linguistic area information registration table 203a: on the basis of a result obtained by counting each character code stored in the character code data accumulation area 204a; or by analyzing the character code data accumulated in the character code data accumulation area 204a. However, when the user directly inputs linguistic area information through the operation panel 206, the font cache control portion 201b may register (set) the inputted linguistic area information in the linguistic area information registration table 203a. In addition, when the PC 100 transmits printable data to the image forming apparatus 200, a destination of an OS (operating system) may be set for the printable data, and the image forming apparatus 200 may set linguistic area information on the basis of the destination that is set for the printable data. Moreover, when setting of linguistic area information based on the character codes stored in the character code data accumulation area 204a, setting of linguistic area information by direct input by the user, and setting of linguistic area information based on a destination that is set for printable data are redundantly performed, priority that determines which setting is prioritized may be provided.

In addition, regarding the character code data accumulation area 204a that accumulates and stores character codes of printable data requested to be printed, setting is possible in which character codes are accumulated while the image forming apparatus 200 is powered on, or character codes are accumulated only during a predetermined time period.

In addition, the case where Embodiment 1 is carried out in the image forming apparatus 200 and Embodiment 2 is carried out in the image forming apparatus 210 has been described, but both Embodiment 1 and Embodiment 2 may be carried out in a single image forming apparatus.

In addition, in Embodiment 1, the process example has been described in which, as a determination process based on a used state of a character image, the control portion 201 determines whether a character code of a character image is present in the character code data that is set for each linguistic area of the linguistic area information registration table 203a; and if the character code is present, the character image is stored at the position of the head of the font cache storage area 202a. However, the present disclosure is not limited to such a determination process. For example, as a process example, the control portion 201 may determine whether a frequency of use of a character image is not lower than a predetermined threshold, and if the frequency of use is not lower than the threshold, the character image may be stored at the position of the head of the font cache storage area 202a. In addition, any determination process based on a used state of a character image is applicable.

Such an image forming apparatus according to the present disclosure is able to perform printout at a high speed by improving the use efficiency of the character images in the font cache.

The present disclosure is suitable for an image forming apparatus, but is not limited to an image forming apparatus and is applicable to general apparatuses having a font cache.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, including a cache memory area in which bitmap graphics of character fonts are stored, comprising:

a font cache storage portion configured to store a character image by an LRU method; and a first determination portion configured to determine whether to store the character image at a position of a head of the font cache storage portion or at a position of a rear of the font cache storage portion, on the basis of a used state of the character image, wherein the first determination portion determines to store the character image at the position of the head if a frequency of use of the character image is not lower than a threshold and if a character code of the character image is present as a character code that is set for each linguistic area, and determines to store the character image at the position of the rear if the frequency of use of the character image is not lower than the threshold and if the character code of the character image is not present as the character code that is set for each linguistic area.

2. The image forming apparatus according to claim 1, further comprising a linguistic area information registration portion configured to register linguistic area information, wherein the first determination portion determines whether to store the character image at the position of the head or at the position of the rear, for each linguistic area of the linguistic area information registered by the linguistic area information registration portion.

3. The image forming apparatus according to claim 1, further comprising a second determination portion configured to determine whether to delete the character image stored in the font cache storage portion, on the basis of whether the character code of the character image is present as a character code that is set for each linguistic area when a job is switched.

4. The image forming apparatus according to claim 2, further comprising a second determination portion configured to determine whether to delete the character image stored in the font cache storage portion, on the basis of whether the character code of the character image is present as a character code that is set for each linguistic area when a job is switched.

5. The image forming apparatus according to claim 4, wherein the second determination portion determines whether to delete the character image, for each linguistic area of the linguistic area information registered by the linguistic area information registration portion.

6. The image forming apparatus according to claim 2, further comprising an accumulation portion configured to accumulate character codes of printable data, wherein the linguistic area information registration portion registers as the linguistic area information the linguistic area determined on the basis of character codes accumulated by the accumulation portion.

7. The image forming apparatus according to claim 6, wherein the linguistic area information registration portion registers as the linguistic area information the linguistic area for a character code having a high frequency of use among the character codes accumulated by the accumulation portion.

8. The image forming apparatus according to claim 2, further comprising a linguistic area information input portion configured to input the linguistic area information, wherein the linguistic area information registration portion registers the linguistic area information inputted by the linguistic area information input portion.

9. The image forming apparatus according to claim 2, wherein the linguistic area information registration portion registers the linguistic area information on the basis of a destination that is set for printable data.

* * * * *